No. 740,135. PATENTED SEPT. 29, 1903.
J. P. HOOPS.
COMBINED CORN PICKER AND HUSKER.
APPLICATION FILED FEB. 27, 1903.
NO MODEL. 4 SHEETS—SHEET 3.
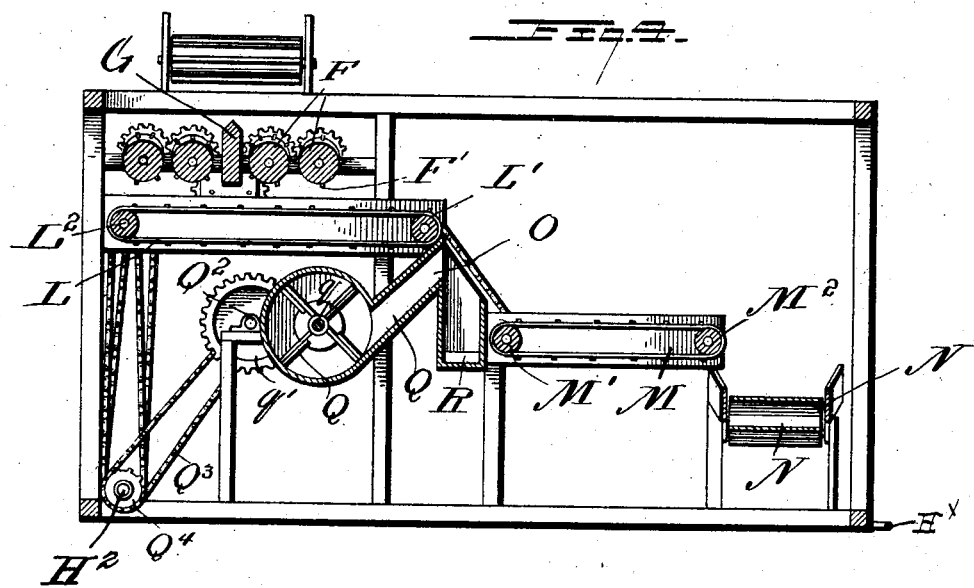
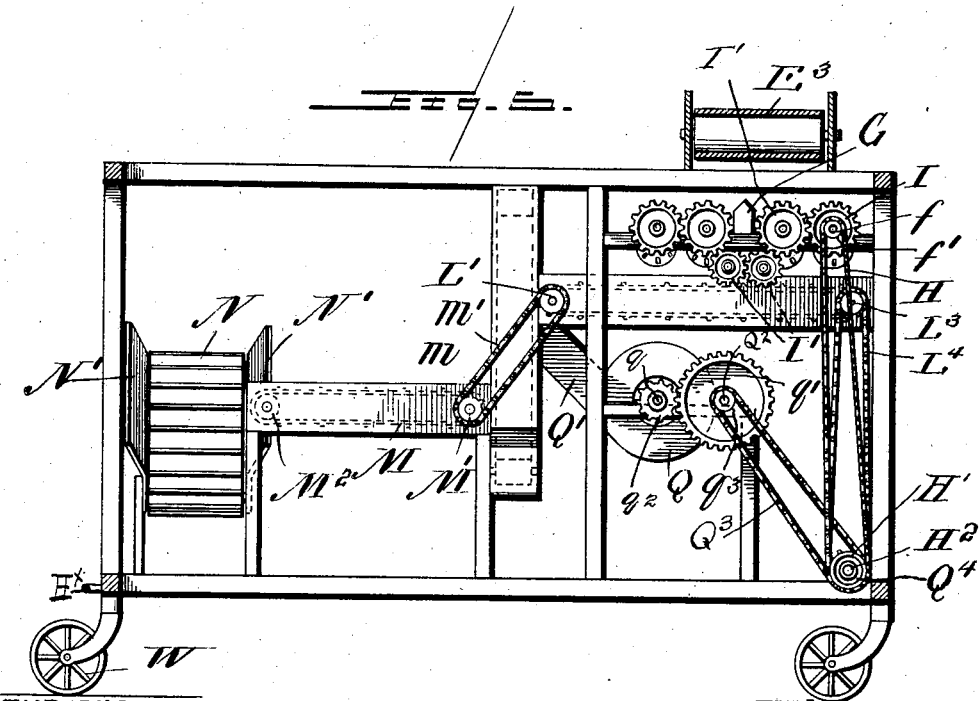

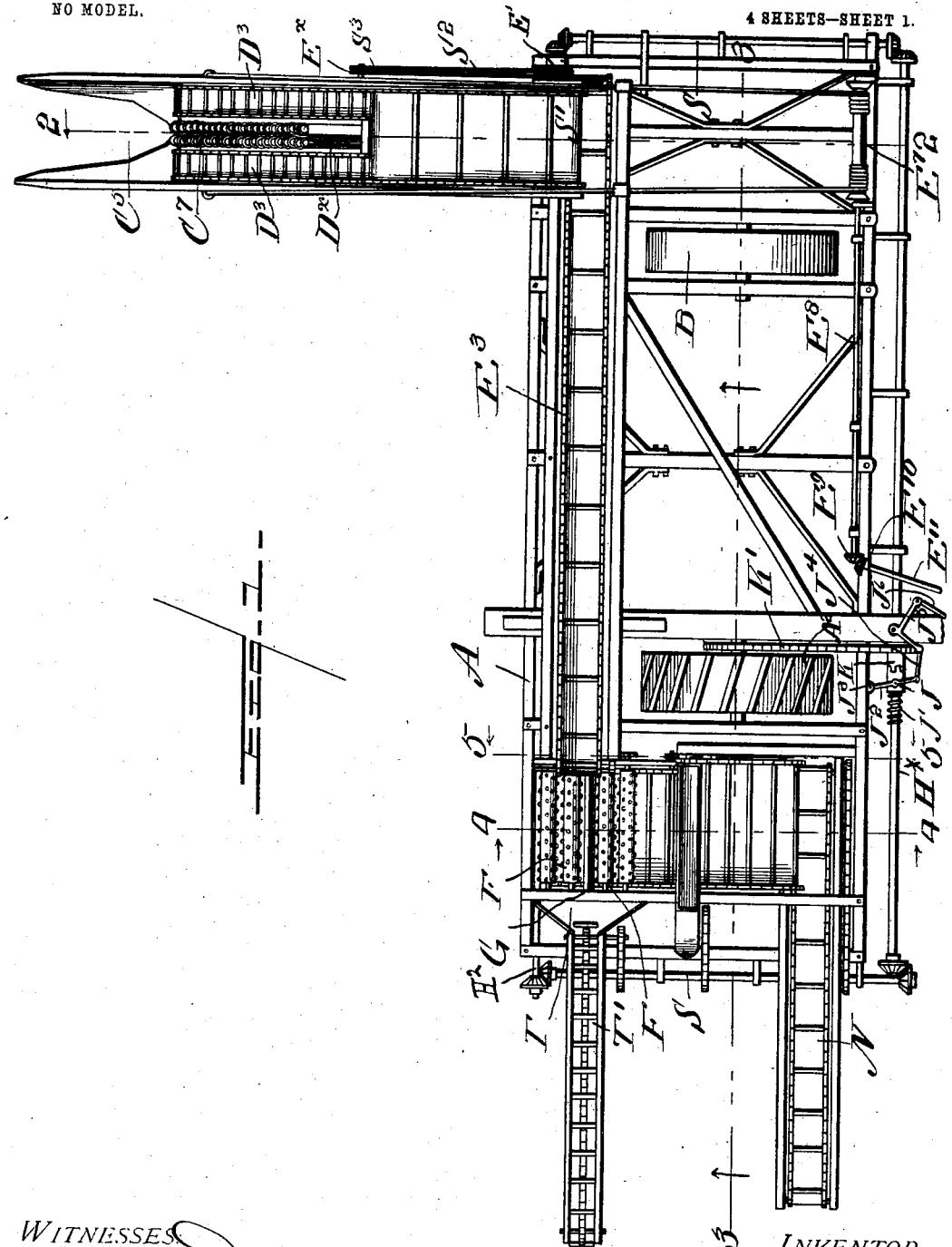

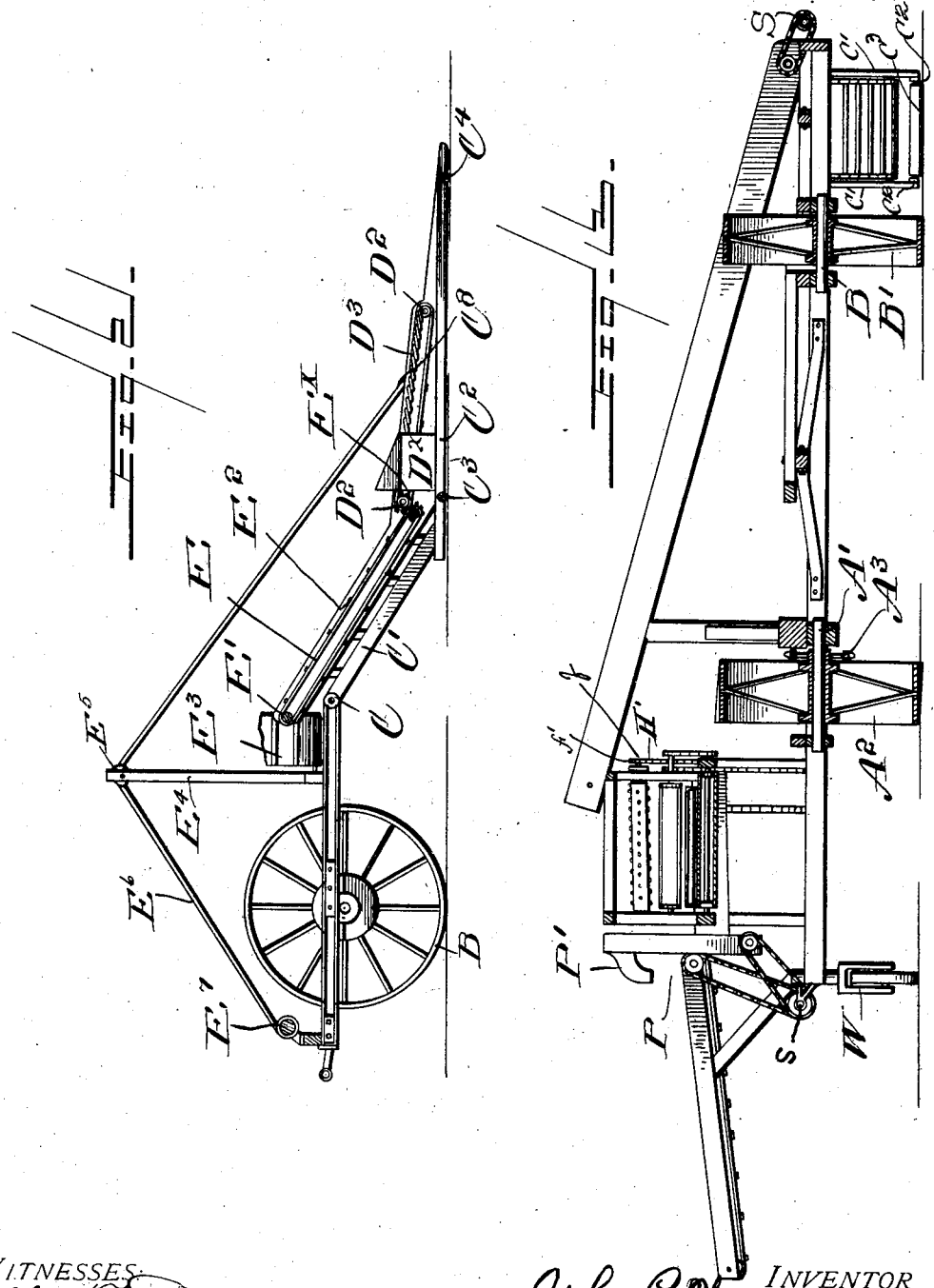

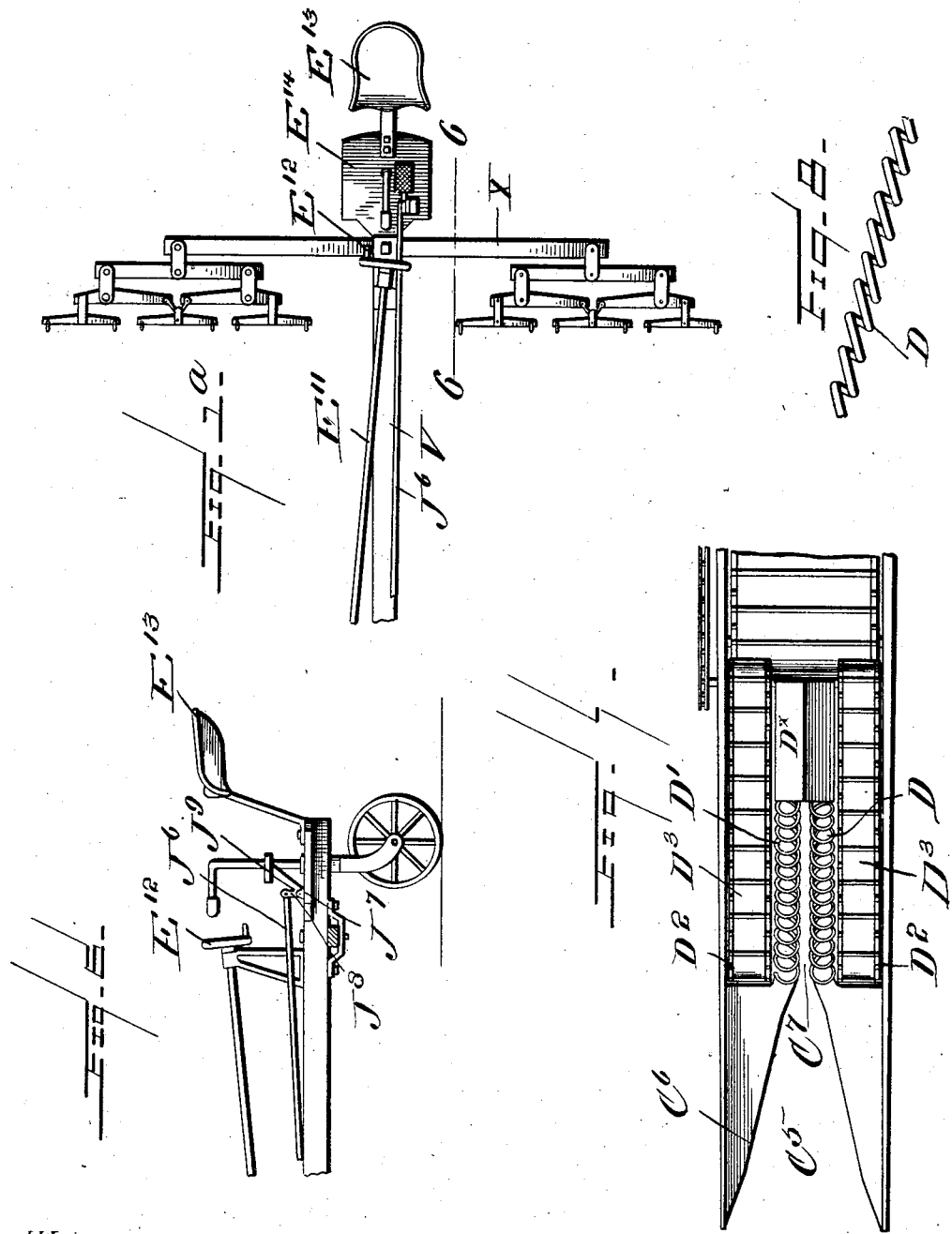

No. 740,135.                                              Patented September 29, 1903.

UNITED STATES PATENT OFFICE.

JOHN P. HOOPS, OF HALSTEAD, KANSAS.

COMBINED CORN PICKER AND HUSKER.

SPECIFICATION forming part of Letters Patent No. 740,135, dated September 29, 1903.

Application filed February 27, 1903. Serial No. 145,405. (No model.)

*To all whom it may concern:*

Be it known that I, JOHN P. HOOPS, a citizen of the United States, residing at Halstead, in the county of Harvey and State of Kansas, have invented certain new and useful Improvements in a Combined Corn Picker and Husker; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in corn pickers and huskers, and comprises means for stripping the ears of corn from the stalks as the machine is driven over the rows and means for conveying the ears to a husking apparatus and thence by endless carriers to positions in which they are deposited in a wagon or other receptacle.

The invention consists, further, in various details of construction and in combinations of parts, which will be hereinafter fully described and then specifically defined in the appended claim.

The invention is illustrated in the accompanying drawings, which, with the letters of reference marked thereon, form a part of this application, and in which drawings—

Figure 1 is a top plan view of a portion of my improved corn picker and husker. Fig. 1ᵃ is a top plan view of the balance of the machine which is not shown in Fig. 1. Fig. 2 is a vertical sectional view taken on line 2 2 of Fig. 1, and Fig. 3 is a vertical sectional view taken on line 3 3 of Fig. 1 and looking in the direction of the arrows. Fig. 4 is a cross-sectional view on line 4 4 of Fig. 1 looking in the direction of the arrows, and Fig. 5 is a cross-sectional view on line 5 5 of Fig. 1 looking in the direction of the arrows. Fig. 6 is a sectional view taken on line 6 6 of Fig. 1ᵃ. Fig. 7 is a top plan view of the portion of the apparatus which strips the ears from the stalks, and Fig. 8 is a detail view in elevation of the stripping-coils.

Reference now being had to the details of the drawings by letter, A designates the frame of the apparatus, which has mounted therein an axle A', to which is keyed a driving-wheel A², and mounted upon the same shaft and rotating therewith is a sprocket-wheel A³. A second wheel B' is journaled upon a shaft B, also mounted in the cross-pieces of the frame and adapted to support one side of the apparatus. Mounted upon a shaft C, which is supported by the cross-pieces of the frame, are the bars C⁸, to the forward ends of which is connected a frame C², which carries the mechanism for stripping the ears of corn from the stalks. Said frame C² has a caster wheel or roller C³ journaled therein to support the frame a slight distance above the ground, and rollers C⁴ are journaled adjacent to the free end of said frame, rollers on one side of the frame showing in Fig. 2 of the drawings. Said frame C² has its forward end recessed out, as at C⁵, as shown clearly in Figs. 1 and 7 of the drawings, and the edges of said recessed portion C⁵ are inclined, as at C⁶, and converge rearward and merge into a contracted portion C⁷, into which the stalks of corn pass, being guided into said contracted portion by means of the inclined edges C⁶ of said recessed portion. By mounting the frame C² adjacent to the ground with the forward end of the same in the form illustrated it will be observed that any stalks of corn which may be lying prostrate upon the ground may be lifted up by the nose of the frame and guided into the recessed and contracted portion of the frame. Mounted adjacent to the longitudinal marginal edges of said contracted portion C⁷ and parallel to each other are the coils D D', which are provided for the purpose of engaging the ears of corn as the machine passes over a row of corn, it being the purpose of said coil members to engage and strip off the ears of corn and leave the stalks standing by said ears catching in the coils.

While I have shown coils for the purpose of removing the ears from the stalks, it is my purpose to employ, if desired, various means for severing the ears from the stalks, the coils being illustrated as a convenient means for this work.

D² designates rollers which are journaled in the frame C², and over said rollers the endless conveyers D³, having cross-pieces thereon, are adapted to travel. Said conveyers D³, as shown in Fig. 2 of the drawings, have a slight inclination and are adapted for the purpose of elevating the ears of corn as they are stripped from the stalks and as they drop from the strippers and deposit the same upon an endless carrier E, which is mounted upon the shafts E' and $E^x$. (Shown in Fig. 2 of the drawings.) The ears as they are stripped from the stalks fall upon the inclined deflecting members $D^x$ and fall down the inclined sides of said members upon the conveyers on either side. Said conveyer E is provided with cross-pieces $E^2$, whereby the ears may be elevated and deposited onto an endless carrier $E^3$, adapted to convey the ears to the part of the mechanism where the husks are designed to be removed therefrom.

Mounted upon the standard $E^4$ of the frame of the machine is a pulley $E^5$, over which a rope $E^6$ passes which is connected at one end to the frame $C^2$, as at $C^8$, while its other end is fastened to and adapted to wind about a roller $E^7$, said roller being mounted upon and adapted to rotate with a shaft $E^8$, Fig. 1 of the drawings, which shaft is journaled upon the frame of the machine and carries at one end a bevel-gear $E^9$, which is in mesh with a similar gear-wheel $E^{10}$, fixed to the end of the shaft $E^{11}$. Said shaft $E^{11}$ has a hand-wheel $E^{12}$, Fig. 1$^a$ of the drawings, at a convenient distance from the seat $E^{13}$, upon which the operator is adapted to sit, said seat being mounted upon the platform $E^{14}$. By rotating the wheel $E^{12}$ it will be observed that the roller or drum $E^7$ may be rotated, and the rope $E^6$ may be made to wind upon the same, which will cause the frame $C^2$ to be raised from the ground, thus adjusting the same at different heights from the ground or, if desired, to be sufficiently elevated so as not to engage or strip the ears of corn from the stalks.

Referring to Figs. 1, 4, and 5 of the drawings, F F designate two sets of husking-rollers, which are preferably of solid metal and having radiating lugs F', seated in the circumferences thereof at suitable distances apart, said lugs being of any suitable shape which may be found best adapted for the purpose of removing the husks from the ears of corn as the latter are dropped upon said husking-rollers from the conveyer $E^3$, Fig. 1 of the drawings. Intermediate the two sets of husking-rollers, which latter are suitably journaled in the frame of the machine, is a separating member G, the upper edge of which is inclined, as shown clearly in Figs. 4 and 5 of the drawings. Said separating member is provided for the purpose of causing the ears of corn as they drop from the endless carrier $E^3$ to pass to one set or the other of the husking-rollers.

On one of the spindles $f$ of one of the rollers is mounted a sprocket-wheel $f'$, about which a sprocket-chain H travels, which chain passes also about a sprocket-wheel H', that is keyed to rotate with the shaft $H^2$, Fig. 5 of the drawings, and pinion-wheels I are fixed to the spindles of the husking-rollers, which coöperate with the intermeshing gear-wheels I' to cause the rollers to rotate in unison and toward each other. A shaft $H^x$ is journaled in suitable bearings upon the frame of the machine and has splined thereto a clutch J, which has a spring J' bearing against the same, as shown in Fig. 1 of the drawings, the other end of the spring being fixed, and a lever $J^2$ is pivoted at $J^3$ to the frame of the machine and also to said clutch member J, while its other end is connected by means of a link $J^4$ with an angle-lever $J^5$, to which angle-lever a rod $J^6$ is pivoted. Mounted upon a bracket $J^7$, Fig. 6 of the drawings, is an angle-lever $J^8$, which has a foot-lever $J^9$ on one arm thereof positioned on the platform which supports the seat $E^{13}$, whereby when the operator desires to throw the apparatus out of operation it may be done by throwing the clutch member out of engagement with the loosely-journaled clutch-block K, which is mounted upon the shaft $H^2$, Fig. 1 of the drawings. Said clutch-block K has either secured thereto or integral with the same a sprocket-wheel which has a sprocket-chain K', which passes over a sprocket-wheel $A^3$, which rotates with the main driving-wheel $A^2$, whereby the shaft $H^2$ may be rotated when the two clutch-blocks are thrown together.

Positioned underneath the husking-rollers is an endless carrier L, (shown clearly in Figs. 4 and 5 of the drawings,) which carrier travels over the rollers L' and $L^2$, the spindle of the latter carrying a sprocket-wheel $L^3$, (shown in Fig. 5 of the drawings,) which is driven by means of a sprocket-chain $L^4$, which travels about a sprocket-wheel H', whereby said conveyer L is driven.

M designates an endless conveyer which travels about the rollers M' and $M^2$, and fixed to rotate with the roller M' is a sprocket-wheel $m$, about which and the sprocket-wheel upon the spindle L' passes a driving-chain $m'$. Adjacent to the outer end of the carrier M is an endless carrier N, which is disposed at right angles to the carrier M and has along each longitudinal side thereof the inclined boards N', Figs. 4 and 5 of the drawings, and said conveyers M and N are provided for the purpose of conveying the husks and leaves that have been stripped from the ears and depositing the same either in a wagon-box or other receptacle which may be driven adjacent to the outer end of the conveyer N.

Intermediate the conveyers L and M is an inclined screen or sieve O, on which the husks and leaves of corn and any kernels of corn that may be stripped from the ears as they pass through the husking-rollers are adapted to be deposited from the conveyer L, and in order to free the kernels from the leaves and husks I provide a rotary fan Q, Fig. 4 of the drawings, mounted in a suitable case, and a passage-way Q', leading from said fan to a location adjacent to said inclined screen, is provided for the purpose of winnowing the kernels and allowing the same to fall through said inclined screen and onto a conveyer R, from which they may be conveyed to and deposited into a bag P, which may be attached to the spout P'. Said fan is mounted upon a shaft $q$, having a gear-wheel $q^2$ thereon, which is in mesh with the teeth of the gear-wheel $q'$, and a sprocket-wheel $q^3$ is mounted to rotate with the shaft $Q^2$, and a sprocket-chain $Q^3$ travels about said sprocket-wheel $q^3$ and a sprocket-wheel $Q^4$, as clearly shown in Figs. 4 and 5 of the drawings.

Adjacent to the outer ends of the husking-rollers is an inclined chute T, (shown clearly in Fig. 1 of the drawings,) and down which the ears of corn are adapted to fall after they have been stripped of the husks, and as they fall down said incline they are conveyed up the inclined conveyer T' and are adapted to be deposited in a wagon or other receptacle, which may be driven along adjacent to the outer end of said conveyer T'.

Journaled in suitable bearings in the frame of the machine is a shaft S, which has gear connection with shaft $H^2$ and also with a shaft E', Fig. 1 of the drawings, which is provided for the purpose of driving the endless carriers $D^3$, which elevate the ears as they are stripped from the stalks of corn. Said shaft E' has gear connections at each end with the shafts S, there being two shafts S, one mounted at each end of the frame, as shown in Fig. 1 of the drawings. A sprocket-chain $S^2$, which passes about sprocket-wheels S' and $S^3$, is provided to impart motion from the shaft E' to the shaft $E^×$, and by means of geared connections between the shafts $E^×$ and $D^2$ the conveyers $D^3$ are driven.

Mounted underneath the frame of the machine are suitable caster-wheels W, as shown in Figs. 3 and 5 of the drawings, whereby the weight of the machine is suitably supported, and referring to Fig. 1ª of the drawings it will be observed that the tongue V of the apparatus supports at its rear end the platform for the seat of the apparatus and also the evener, (indicated by letter X,) it being my purpose to attach the horses to the eveners and to push the machine in advance of the teams.

The operation of my apparatus will be readily understood when taken in connection with the drawings forming a part of my application, and is as follows: The apparatus being pushed forward by the teams which are attached to the eveners the recessed portions of the frame $C^2$ are driven over the rows of corn. The ears are stripped from the stalks as they are caught in the coils along the marginal edges of the contracted recess $C^7$. The ears falling upon the endless conveyer on either side of the coils are carried rearward and dropped upon the endless conveyer E, from thence to the elevator $E^3$, and are deposited upon opposite sides of the inclined dividing member G, and being acted upon by the lugs which radiate from the circumferences of the husking-rollers the husks fall through upon the conveyer L and are carried and deposited on the inclined meshwork-screen O, through which any kernels that may be torn from the ears are adapted to fall, and as the husks fall down said inclined screen they are acted upon by a blast from the fan, which separates the kernels from the husks, and the husks are advanced by the conveyers M and N and may be deposited into a wagon, which may be driven along near the outer end of the conveyer N. The kernels of corn which fall through the screen O are raised by the elevator R and may be deposited into a bag P, as shown in Fig. 3 of the drawings. The ears of corn which have been husked fall down the inclined way T and upon the endless conveyer T', up which they may be conveyed and emptied into a wagon or other receptacle which may be driven along adjacent to the outer end of said conveyer T'. When it is desired to throw the apparatus out of gear, the operator depresses the foot-lever and the clutch members are separated, and when it is desired for any purpose to raise the frame $C^2$ from the ground it may be done by rotating the hand-wheel $E^{12}$, located at a convenient distance from the seat of the operator.

While I have shown a certain arrangement of apparatus whereby my invention may be carried out it will be understood that I may make alterations in the detailed construction of the same without departing from the spirit of the invention.

Having thus fully described my invention, what I claim as new, and desire to secure by Letters Patent, is—

In combination with the truck of the apparatus, a tongue extending rearwardly therefrom, a windlass upon said truck, an inclined portion of the truck opposite said tongue, a frame pivotally mounted to the lower end of said inclined portion of the truck, rollers mounted near the ends of said pivotal frame, a deflecting-block having a ridge which is downwardly and forwardly inclined, mounted upon said frame, a recess in the free end of the frame extending forward from the end of said deflecting-block, stripping-coils arranged along the parallel marginal edges of said recessed portion, said edges of the recessed portion flaring outward beyond the ends of said coils, forming a forked guide to said frame, a rope connected at one end to said frame and a standard upon the truck with a pulley thereon over which said rope turns, the other end of said rope winding about said windlass, conveyers extending along the marginal edges of said coils and adjacent to the opposite vertical faces of said deflecting-block, and means for driving said conveyers, all substantially as shown and described.

In testimony whereof I hereunto affix my signature in presence of two witnesses.

JOHN P. HOOPS.

Witnesses:
EMIL L. RUTH,
J. A. LINN.